United States Patent [19]

Riccitiello et al.

[11] Patent Number: 4,767,728
[45] Date of Patent: Aug. 30, 1988

[54] BORON-CONTAINING ORGANOSILANE POLYMERS AND CERAMIC MATERIALS THEREOF

[75] Inventors: Salvatore R. Riccitiello; Ming-Ta S. Hsu; Timothy S. Chen, all of San Jose, Calif.

[73] Assignee: The United States of America as represented by the United States National Aeronautics and Space Administration, Washington, D.C.

[21] Appl. No.: 890,577

[22] Filed: Jul. 30, 1986

[51] Int. Cl.$^4$ ............................................. C04B 35/56
[52] U.S. Cl. .................................. 501/91; 501/88; 501/92; 501/93; 528/4; 528/10; 528/30; 556/402
[58] Field of Search .................... 501/88–95; 528/4, 10, 30; 556/402

[56] References Cited

U.S. PATENT DOCUMENTS

| | | | |
|---|---|---|---|
| 3,154,520 | 10/1964 | DuPont et al. | 528/4 |
| 4,152,509 | 5/1979 | Yajima et al. | 528/4 |
| 4,298,559 | 11/1981 | Baney et al. | 501/88 |
| 4,482,669 | 11/1984 | Seyferth et al. | 528/37 |
| 4,490,192 | 12/1984 | Gupta et al. | 423/344 |
| 4,524,138 | 6/1985 | Schwetz et al. | 501/90 |
| 4,550,151 | 10/1985 | Takamizawa et al. | 528/5 |
| 4,572,902 | 2/1986 | Matano et al. | 501/97 |
| 4,604,367 | 8/1986 | Takamizawa et al. | 501/95 |

FOREIGN PATENT DOCUMENTS

3447411  7/1985  Fed. Rep. of Germany ........ 501/95
55-020269  of 1980  Japan .

Primary Examiner—William R. Dixon, Jr.
Assistant Examiner—Anthony Green
Attorney, Agent, or Firm—Darrell G. Brekke; John R. Manning; Charles E. B. Glenn

[57] ABSTRACT

The present invention relates to a polyorganoborosilane ceramic precursor polymer comprising a plurality of repeating units of the formula:

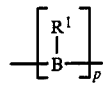

with the segments being linked together by second units of the formula: $-(R^2)-Si-R^3)-q$, where $R^1$ is lower alkyl, cycloalkyl, phenyl, or

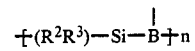

and $R^2$ and $R^3$ are each independently selected from hydrogen, lower alkyl, vinyl, cycloalkyl, or aryl, n is an integer between 1 and 100; p is an integer between 1 and 100; and q is an integer between 1 and 100. These materials are prepared by combining an organoborohalide of the formula $R^4\text{-B-}(X^1)_2$ where $R^4$ is selected from halogen, lower alkyl, cycloalkyl, or aryl, and an organohalosilane of the formula : $R^2(R^3)\text{Si}(X^2)_2$ where $R^2$ and $R^3$ are each independently selected from lower alkyl, cycloalkyl, or aryl, and $X^1$ and $X^2$ are each independently selected from halogen, in an anhydrous aprotic solvent having a boiling point at ambient pressure of not greater than 160° C. with in excess of four equivalents of an alkali metal, heating the reaction mixture and recovering the polyorganoborosilane. These silicon boron polymers are useful to generate high-temperature ceramic materials, such as SiC, SiB$_4$, and B$_4$C, upon thermal degradation above 600° C.

21 Claims, 2 Drawing Sheets

FTIR of POLYMER I

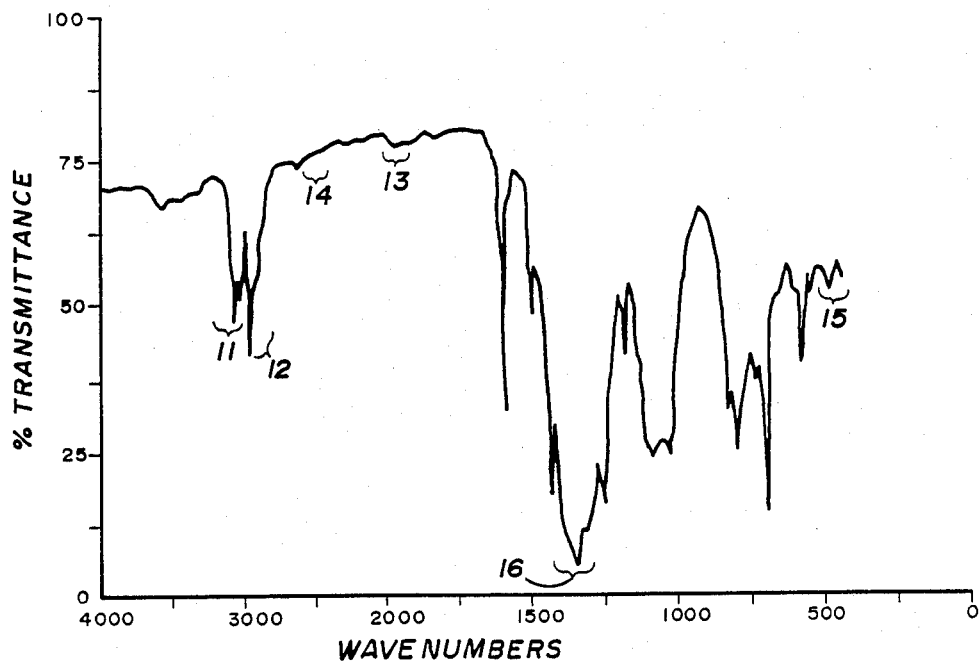
FIGURE 1 FTIR of POLYMER I
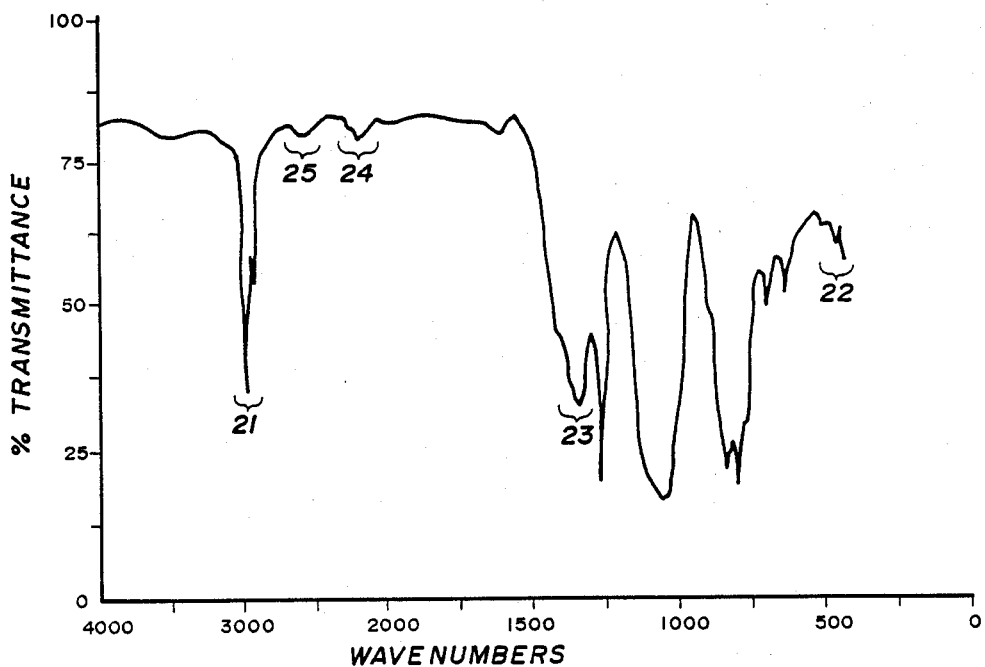
FIGURE 2 FTIR of POLYMER II

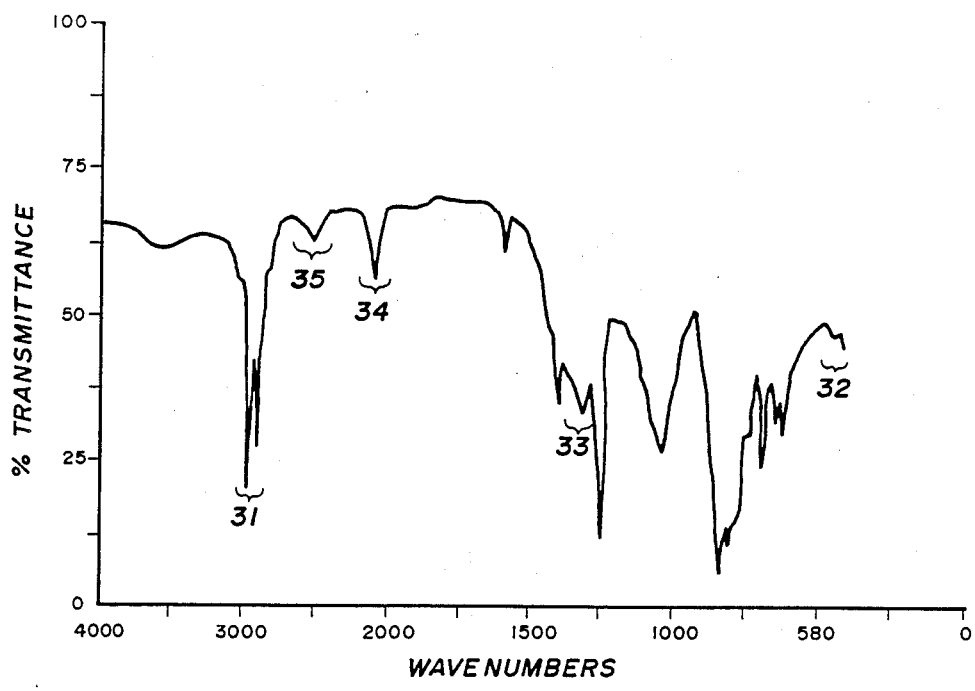
FIGURE 3 FTIR of POLYMER III
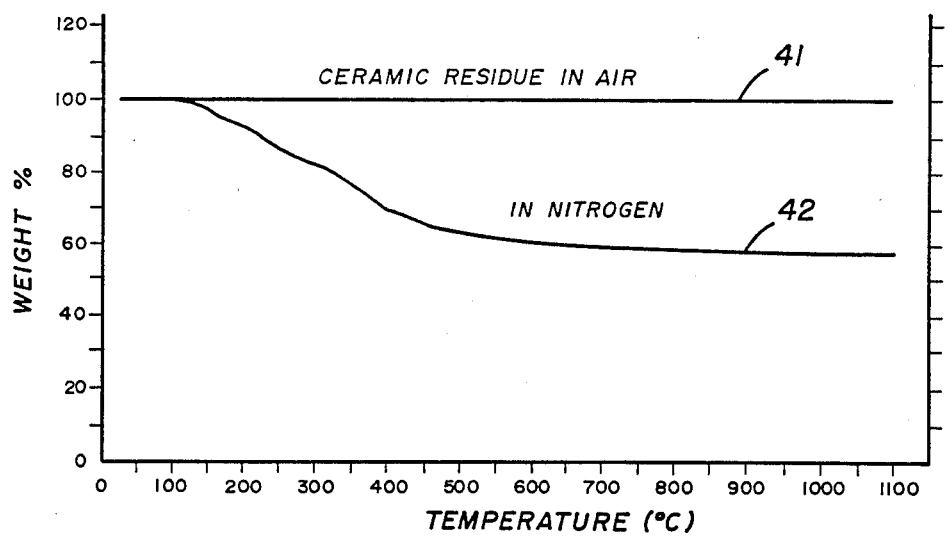
FIGURE 4 TGA of POLYMER II

BORON-CONTAINING ORGANOSILANE POLYMERS AND CERAMIC MATERIALS THEREOF

ORIGIN OF THE INVENTION

The invention disclosed herein was made in the performance of work under a NASA Contract and is subject to Public Law 96-517 (35 U.S.C. §200 et seq.). The contractor has not elected to retain title in this invention.

BACKGROUND OF THE INVENTION

1. Field of the Invention

The present invention relates to organic silicon-boron polymers which upon pyrolysis produce high-temperature ceramic materials. More particularly, it relates to the polyorganoborosilanes containing -Si-B-bonds which generate high-temperature ceramic materials (e.g., SiC, $SiB_4$, $SiB_6$, $B_4C$) upon thermal degradation. The processes for preparing these organic silicon-boron polymer precursors are also a part of this invention.

2. Description of the Prior Art

Silicon carbide, silicon nitride, silicon-boron-oxide and mixtures thereof have generated considerable interest as ceramic materials. They have high thermal and oxidation stability and, are among the hardest materials that can be made. Other advantageous properties include low electrical conductivity, low co-efficient of thermal expansion, thermal shock resistance, creep resistance, high strength at elevated temperatures, and corrosion resistance. A few references which are of general interest follow:

D. Seyferth et al. disclose in the *Communications of the American Ceramic Society*, July 1984, pp. C-132 to C-133, the high-yield synthesis of $Si_3N_4$/SiC/C ceramic materials by the pyrolysis of a polyoganosilazane. The polyorganosilazane is prepared by the reaction of dichlorosilane, $H_2SiCl_2$, with gaseous ammonia. The ammonialysis product is pyrolyzed in nitrogen atmosphere to give a 70 percent yield of $Si_3N_4$.

In a similar manner, D. Seyferth et al. disclose in U.S. Pat. No. 4,482,669 the preparation of pre-ceramic polymers having repeating units of —(NH—SiR)$_n$— and

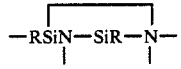

where R is hydrogen or one of a variety of alkyl, aryl, alkylsilane, or alkylamino groups. Upon pyrolysis, these polymers are useful to produce varieties of silicon nitride or silicon nitride-silicon carbide. Silcon-boron polymers are not disclosed or suggested.

In U.S. Pat. No. 3,154,520, J. A. DuPont et al. disclose the preparation of monomeric high-energy boron-containing compounds of the formula: $X-CH_2CH_2-Si(A)_y(R)_z$, where X is $-B_5H_8$ or $-B_{10}H_{13}$, A is chloro or bromo and R is $-CH_3$ or $-CH_2CH_3$.

In U.S. Pat. No. 3,431,234, M. M. Fein et al. disclose novel polymeric products of a carboranylsilane prepared by reacting a compound of the formula: $R-(CB_{10}H_{10}C)-(CH_2)_a-Si(X)_2-R'$ with water to form a polysiloxane (—Si—O—) polymer.

In U.S. Pat. No. 4,152,509, S. Yajima et al. disclose the preparation of a number of polysiloxanes by treating at least one boric acid composed with phenylsilane. Polyborosilanes are not disclosed. In U.S. Pat. No. 4,283,376, S. Yajima et al. disclose a process for producing polycarbosilane partly containing siloxane bonds (—Si—O—) wherein a part of the polycarbosilane comprises polyborosiloxane and a structure composed of boron, silicon, and oxygen. The polycarbosilane is converted into silicon carbide fibers by first preparing a spinning dope, treating the dope to render it infusible under tension or under no tension and firing the treated dope in a vacuum or in an inert atmosphere.

In U.S. Pat. No. 4,298,559, R. H. Baney et al. disclose the preparation of polysilanes having the average formula $[(CH_3)_2Si][CH_3Si]$. These polysilanes are prepolymers which produce silicon carbide ceramic materials when pyrolyzed in an inert atmosphere.

In U.S. Pat. No. 4,572,902, Matano et al. disclose a method for producing ceramics having a closed-pore size from a sintered body of a $Si_3N_4$—SiC composition. The process includes heating the ceramic sintered article in a flowing gas mixture of chlorine and nitrogen at 500° C. to 1,500° C.

In U.S. Pat. No. 4,490,192, A. Gupta et al. disclose the preparation of finely divided particles of less than 1 micron in diameter having the composition of $B_xSi_y$, $B_xN_y$, $P_xSi_y$, $P_xN_y$, and the like. These particles are prepared in flowing argon with pyrolysis occurring using a laser.

Takamiza et al. in Japanese patent publications Nos. 80500/78 and 101099/78 disclose the preparation of polymers made from methylchlorosilanes, however, no mention is made of the yields of ceramic material generated by the decomposition of the polysilanes. More recently in Japanese Kokai Nos. 79/114600 and 79/83098 suggest that the preparation of silicon carbide precursor polymers having a silicon-carbon (—Si—C—Si—) bond are prepared by heating organosilicon compounds including $(CH_3)_3Si$—$Si(CH_3)_2Cl$ in the presence of B, Al, Si, Ge, Sn and Pb compounds or HI and its salts at high temperatures.

Additional references of general interest in the art include B. G. Penn et al., *Journal Applied Polymer Science*, Vol 27, p. 3751, published in 1982; K. J. Wynne et al., *Annual Reviews of Material Science*, Vol. 14, p. 297, published in 1984; and H. Noth et al., *Chem. Ber.*, Vol. 99, p. 2197, published in 1966.

None of the above references disclose or suggest the polymer precursors the polyorganoborosilanes or silicon-boron ceramic polymers of the present invention.

It is highly desirable to have polymer precursors for -Si-B-ceramic materials that are formed from readily available and relatively inexpensive starting materials and in high yield. Additional desirable properties include stability at room temperature for prolonged periods of time, relatively stable to hydrolysis at atmospheric moisture levels, and high yield of ceramic material upon pyrolysis.

SUMMARY OF THE INVENTION

The present invention relates to a polyorganoborosilane ceramic precursor polymer comprising a plurality of repeating units of the formula:

(A)

the units being linked together by second units of the formula:

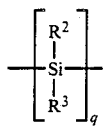
(D)

wherein R$^1$ is lower alkyl, cycloalkyl, phenyl, or

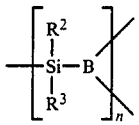
(E)

wherein R$^2$ and R$^3$ are each independently selected from lower alkyl, cycloalkyl, or phenyl; n is an integer between 1 and 100; p is an integer between 1 and 100; and q is an integer between 1 and 100.

In a preferred embodiment n, p, and q are each between 1 and 50, and more preferred between 1 and 12.

The present invention also relates to a process for preparing a polyorganoborosilane, which process includes:

(a) combining an organic borohalide of the formula: R$_4$-B-(X$^1$)$_2$ and an organohalosilane of the formula: R$^2$R$^3$Si(X$^2$)$_2$ wherein R$^4$ is selected from halogen, lower alkyl, vinyl, cycloalkyl, or phenyl;

R$^2$ and R$^3$ are each independently selected from hydrogen, halogen, lower alkyl, vinyl, cycloalkyl, aryl, or substituted aryl; and X$^1$ and X$^2$ are each independently selected from halogen, in an anhydrous aprotic solvent having a boiling point at ambient pressure of not greater than 160° C., with at least four equivalents of an alkali metal;

(b) heating the reaction mixture for a time and at a temperature up to 160° C. effective to produce a polyorganoborosilane; and (c) recovering the polyorganoborosilane of step (b).

Another aspect of the present invention is the production of silicon-boron-carbon ceramic materials, useful in high temperature applications, by the pyrolysis of the polyorganoborosilane polymers of the present invention. Generally temperatures between about 600° and 1300° C. are used.

BRIEF DESCRIPTION OF THE DRAWINGS

FIG. 1 is the Fourier Transform Infrared (FTIR) spectrum of the polyorganoborosilane—POLYMER I.

FIG. 2 is the Fourier Transform Infrared (FTIR) spectrum of the polyorganoborosilane—POLYMER II.

FIG. 3 is the Fourier Transform Infrared (FTIR) spectrum of the polyorganoborosilane—POLYMER III.

FIG. 4 is the thermogravimetric analysis (TGA) of POLYMER II.

DETAILED DESCRIPTION OF THE INVENTION AND PREFERRED EMBODIMENTS

The boron-containing organosilane polymers that are ceramic precursors are prepared by a coupling reaction of boron halides or organoboron halides with organic halosilanes in an aprotic solvent.

As used herein:

"Boron halide" refers to boron trichloride, boron tribromide, or mixtures thereof.

"Organoboron halides" refers to lower alkyl-, lower alkynyl, cycloalkyl, or aryl bromides or chlorides.

"Lower alkyl groups" refers to methyl, ethyl, propyl, or butyl groups. Methyl is generally preferred. In this application, the term may also include lower alkenes up to four carbon atoms, preferably vinyl.

"Cycloalkyl groups" refers to cyclobutyl, cyclopentyl, and cyclohexyl groups. Cyclobutyl is generally preferred.

"Aryl groups" are generally phenyl and lower alkyl substituted phenyl groups. Phenyl is generally preferred.

"Aprotic solvent" refers to those solvents having no active hydrogen atoms and include, for example, hydrocarbons, olefins, chlorinated hydrocarbons, aromatics, chlorinated aromatics, and the like. The boiling point of these solvents at ambient pressure is usually not higher than 160° C. for the purposes of the present invention. Mixtures of aprotic solvents are also useful in the present invention.

"Alkali metal" refers to lithium, sodium, potassium, or mixtures thereof. Sodium or potassium are preferred.

In the preparation of the polyorganoborosilane polymer, care is taken to keep the reaction mixture free from water and oxygen as much as possible. For instance, the aprotic solvent is usually degassed by flushing it for thirty minutes or more with dry nitrogen or other inert dry gas. The use of the drying agents, such as molecular sieves sodium, or potassium metal, calcium carbonate, magnesium sulfate, and the like may also be used.

The reactions which are occurring in the present invention include the following:

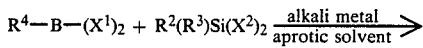

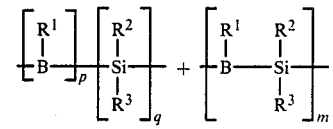

wherein m is an integer from 1 to 100, R$^1$, R$^2$, R$^3$, R$^4$, m, p, and q are as defined herein.

When R$^4$ is phenyl, X$^1$ is chloro, R$^1$=R$^4$, R$^2$ and R$^3$ are each methyl and X$^2$ is chloro, Polymer I described below is produced. The subscripts m, p and q are each generally an integer between 1 and 12.

When R$^4$ is methyl, X$^1$ is bromo, R$^1$=R$^4$, R$^2$ and R$^3$ are methyl and X$^2$ is chloro, Polymer II described below is obtained. The subscripts m, p and q are each generally an integer between 1 and 12.

When R$^4$ and X$^1$ are chloro, R$^1$ is structure (E) above, R$^2$ and R$^3$ are methyl, and X$^2$ is chloro, Polymer III described below is obtained. The subscripts n, p and q are each generally an integer between 1 and 12.

In a general reaction, about four to six equivalents of the alkali metal is freshly cut and added to the anhydrous aprotic solvent at ambient temperature, then heated to between about 100° and 135° C. The R$^4$-B-(X$^1$)$_2$ compound, such as methylborondibromide, phenylborondichloride, etc. and the R$^2$(R$^3$)Si(X$^2$)$_2$, such as dimethyldichlorosilane, in equimolar amounts are combined and slowly added dropwise. The reaction mixture is then refluxed at between about 120° C. and 160° C. for 16 to 24 hours. Methyl iodide or similar alkyl iodide is added and continued to reflux up to an additional 4 hours to remove excess alkali metal and to quench the reaction. After cooling, the alkali halide precipitate has a purple to purple-blue color, and the liquid portion is tan to brown in color. The reaction product is filtered and the solid is washed with additional aprotic solvent. The filtrate is evaporated using reduced pressure to produce a polymer having a molecular weight of between about 800 and 1300 daltons. These polymers are generally soluble in organic solvents and melt at a temperature less than 150° C. The polymers may be either block, alternating or mixtures thereof. The solid separated from the reaction mixture is primarily alkali halide, e.g., sodium chloride, and also includes presently incompletely characterized high molecular weight solid organic product.

In the preparation where in the starting $R^4$ is any alkyl or phenyl groups and $X^1$ is halogen (A), a number of different types of polymers are possible, when combined with (D), e.g.:
Block: .... -A-A-A-D-D-D-D-D- ...
Alternating: ... A-D-A-D-A-D-A-D- ...
Random: ... A-A-D-D-A-D-D-D-A-D-D-A-D-A-A- ...

(The Group A and Group D designations are found in the SUMMARY hereinabove)

In the preparation where $R^4$ is a halogen e.g. chloro and $X^1$ is halogen, e.g. chloro (Group A) and

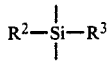

is for example dimethylsilyl (Group D) a number of two and three dimensional polymers [including Group (E)] are possible, e.g.:

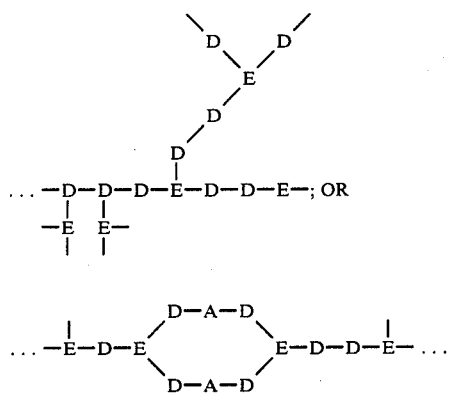

These three-dimension structures are very complex, and both larger and small ring structures are also possible.

It is contemplated that the preparation of the polyorganoborosilanes herein may be performed in anhydrous organic solvents under pressure conditions. Thus, the reactants and solvent(s) may be combined in a pressure reactor and heated under condition that produce autogenic pressure or that the reactants may be pressurized using an inert gas, such as nitrogen, before the heating is begun. Pressures from one atmosphere (1 atm=15 psi) to 100 atmospheres may be employed.

The ceramic yield from the pyrolysis of Polymers I, II, and III in nitrogen is shown in Table A below.

TABLE A

| | Ceramic Yield from Silicon—Boron Polymers Theoretical Ceramic Yield (a) | | |
|---|---|---|---|
| Polymer | SiC + SiB$_4$ (%) | SiC + SiB$_6$ (%) | Found (%) |
| I | 32.9 | 33.5 | 37 |
| II | 53.6 | 57.1 | 57 |
| III | 68.7 | 70.4 | 64 |

These ceramic yields are close to the expected theoretical yields.
(a) Assuming a theoretical alternating structure when p = q.

The polyorganoborosilanes yield ceramic materials up to 64% upon thermal decomposition (pyrolysis) in nitrogen at temperatures up to 1,100° C. The ceramic yields from the pyrolysis of Polymers 1, II, or III are close to those expected from the theoretical yield as is shown above in Table A.

In FIG. 4 is shown the thermogravimetric analysis (TGA) curve for the decomposition of POLYMER II to produce a ceramic material in nitrogen between ambient and 1,100° C. (line 42). The polymer residue/ceramic material showed no weight gain or loss up to 1,100° C. in an air environment (line 41). From this experiment, it can be concluded that once the organic portions of the polymer precursors are pyrolyzed the remaining ceramic materials obtained; e.g., SiC, SiB$_4$, Si-B$_6$ and the like, are very thermally oxidatively stable and do not react further up to about 1,100° C.

The following Examples are to be construed as being illustrative and are not to be considered limiting in any way.

General—Boron trichloride was obtained from Matheson Gas Products. Phenyl boron dichloride and methyl boron dibromide were obtained from Alpha Products. All other chemicals were from Aldrich Chemical Co. Infrared spectra were recorded on a Nicolet MX-1 Fourier Transform Infrared (FTIR). A varian EM360 Nuclear Magnetic Resonance (NMR) spectrometer was used for NMR spectra. A DuPont 1090 thermal analyzer was used for thermogravimetric analysis. Molecular weights of the polymers were measured by the conventional vapor-pressure-osmometry method in chloroform, using Wescan Molecular Apparatus Model 233-200. Electron Spectroscopy for Chemical Analysis (ESCA) was used to measure the surface properties, a Hewlett-Packard Model 5950 ESCA instrument was used. X-Ray defraction (X-RD) measurements were obtained using a conventional General Electric Company X-Ray defractometer.

EXAMPLE 1

Phenylborondichloride and Dimethyldichlorosilane to Produce Polymer I (a) A mixture of phenylborondichloride (5 g, 0.3 mole) and dimethyldichlorosilane (3.9 g, 0.3 mole) in 10 ml of xylene is placed in a dropping funnel and added dropwise into a 3-neck round-bottom flask, containing xylene (30 ml) and sodium (2.8 g, 0.12 mole), equipped with a nitrogen gas inlet. The reaction is carried out at 130° C. to 140° C. (refluxing temperature of xylene) for 18 hrs. Upon cooling, a purple precipitate is filtered and washed with xylene or toluene. This precipitate is further treated with methanol and water. A small quantity of an insoluble, black solid is obtained, but not identified. The xylene filtrate is evaporated to dryness yielding a solid material, Polymer I, which has a molecular weight of 900–1,000. The FTIR spectrum as found in FIG. 1 shows phenyl and methyl peaks at 300–3100 cm$^{-1}$ (peak 11) and 2850–2980 cm$^{-1}$ (peak 12) respectively. The NMR spectrum also shows phenyl and methyl peaks. Additional Polymer I is isolated from the methanol solution on evaporation of the solvent; the polymer is washed with water to remove any sodium methoxide. Total yield of Polymer I is 2 g (46%).

(b) Similarly, the reaction is repeated as is described in Subpart 1(a) above except that a stoichiometrically equivalent amount of p-methylphenylborondichloride is used instead of phenylborondibromide and a stoichiometrically equivalent amount of dibutyldichlorosilane is used instead of dimethyldichlorosilane. A good yield of a polymer of the structure:

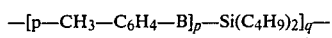

where p and q are each integers between 1 and 12 is expected to be obtained.

EXAMPLE 2

Methylborondibromide and Dimethyldichlorosilane to Produce Polymer II (a) Sodium (13 g; 0.565 mole) and 100 ml of octane are placed in a 500-ml three-neck flask equipped with condenser, nitrogen inlet tube, magnetic stirer, and dropping funnel. The flask is heated to the reflux temperature of the solvent. Dimethyldichlorosilane (17.4 g; 0.135 mole) and 25 g of methylboronidibromide (0.135 mole) in 50 ml of octane are added dropwise to the reaction flask through the dropping funnel over a period of 30 min. The reaction mixture is refluxed for 20 hrs and a purple-blue precipitate is formed. Methyl iodide (0.5 ml) is added to the flask, and the reflux is continued for 2 hrs. After cooling, the reaction is filtered. The brown filtrate is distilled under reduced pressure to remove the solvent. Gummy Polymer II (7.0 g) is collected (61% yield). The molecular weight of Polymer II is about 800 to 1000. The ratio of Si/B for this polymer appears to be about 2 to 5. The purple solid is treated with methanol and water. Only trace amounts of gray insoluble solid are isolated. Small amounts of white solid are isolated from the methanol solution, but not identified. The FTIR spectrum shows methyl peaks at 2800–2900 cm$^{-1}$, (see FIG. 2 at peak 21).

(b) Similarly the reaction is repeated as is described in Subpart 2(a) above with the exception that a stoicheometrically equivalent amount of dibutylboronidichloride is used instead of dibutyldichlorosilane is used instead of dimethyldichlorosilane. A good yield of a -B-Si- polymer of the structure:

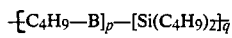

is expected to be obtained where p and q are each integers between 1 and 12.

(c) Similarly when phenylborondibromide is replaced by a stoichemetrically equivalent amount of vinyl borondibromide or cyclobutylborondibromide the corresponding vinylboron or cyclobutylboron polymer having -B-Si-bonds is expected to be obtained in good yield.

EXAMPLE 3

Borontrichloride and Dimethyldichlorosilane to Produce Polymer III (a) Sodium (13 g; 0.6 mole) and 75 ml of dry xylene are placed in a 250-ml three-neck round-bottom flask equipped with a magnetic stirrer, DRY-ICE condenser, nitrogen inlet tube, and a dropping funnel and containing 75 ml of xylene, 0.1 mole of boron trichloride, and 19.3 g of dimethyldichlorosilane (0.15 mole). The flask is heated to about 130° C. with stirring under a gentle flow of dry nitrogen gas. The solution in the dropping funnel is added to the flask over a period of 30 min. The reaction mixture is refluxed for 22 hrs. The DRY-ICE condenser is replaced with water condenser after the mixture is refluxed for 5 hrs. Methyl iodide (1 ml) is added to the reaction flask, and the reflux is continued for 3 hrs. After cooling, the mixture is filtered and the purple solid is washed with xylene. A brown solid (Polymer III; 4.2 g; 41% yield) is isolated from the xylene filtrate after evaporation of the solvent under reduced pressure. Polymer III has a melting point of about 100° C. and a molecular weight of about 1200.

The purple solid is washed with methanol and water to give a white-yellowish solid. Some white solid, isolated from the methanol solution after evaporation of the solvent, is washed with water. Both solids were considered to be high-molecular-weight forms of Polymer III.

The NMR spectrum of POLYMER I has a broad peak at about 7 ppm (aromatic protons) to an internal reference (tetramethylsilane) and broad peaks at about 0.2 ppm (methyl groups). The NMR spectra of Polymer II and Polymer III showed only methyl protons about 0.2 ppm, as expected.

The Fourier Transform Infrared (FTIR) spectrum of Polymer I (FIG. 1) showed both aromatic and aliphatic C—H absorption peaks at 3000–3100 (band 11) and 2850–2980 cm$^{-1}$ (band 12), respectively. The FTIR spectra of Polymer I, Polymer II and Polymer III also indicated the presence of the Si-B bond. Although small Si-H (2100 cm$^{-1}$, band 13, band 24 and band 34) and B-H (2500 cm$^{-1}$, band 14, band 25 and band 35) are present in the polymers, the major structure of the polymers are a polymer and/or a block copolymer as is described herein.

FIG. 2 and FIG. 3 show only aliphatic C—H absorption (peak 21 and peak 31) due to the aliphatic methyl groups. A new band which appears at 1310 cm$^{-1}$ is assigned to the Si-B stretching absorption (band 16, band 23 and band 33). From the literature a weak absorption band was also observed in the region of 440–510 cm$^{-1}$, which was assigned the Si-B bending absorption (band 22 and band 32).

The IR spectra obtained for these -B-Si- polymers described above show the presence of some B-H and Si-H groups in the polymeric material. The quantity of these B-H and Si-H groups, if present, is always very low, of the order of 1–5 percent. It is suggested that the Si-H and B-H bonds are observed because the very reactive Si and B groups during the reaction remove a hydrogen atom from the medium and therefore terminate that -Si-B-unit as a further polymer addition group. It is, therefore, contemplated within the present invention that same small amount of R$^1$, R$^2$ and R$^3$ groups in the organic polymer may be hydrogen.

EXAMPLE 4

Ceramic Products by Pyrolysis (a) The boron-silicon polymers were pyrolyzed at 1300° C. in flowing nitrogen for 1 hr. (Argon can also be used.) Table B shows the atom ratio in the resulting ceramic as measured by electron spectroscopy for chemical analysis (ESCA).

TABLE B

| | Atom Ratio in Ceramic by Pyrolysis | |
|---|---|---|
| Element | Polymer II Ceramic Product | Polymer III Ceramic Product |
| C | 4.5 Carbide | 5.5 Carbide |
| Si | 10 (2.8 SiC) | 7.8 (3 SiC) |
| B | 14 | 13 |

It is seen that in Polymer II carbon is present as 4.5 atom ratio as carbide. Of that carbide 2.8 atom ratio is present as silicon carbide. A portion of the remainder of the silicon is combined as borides, and the remainder of the carbide is combined as boron carbides.

Silicon, carbon, and boron were found in the ceramic products derived from the pyrolysis of the organoborosilicon polymer. The ratio of Si, C, and B indicate the presence of mixtures of SiC and $SiB_x$ where x is between 2 and 6 or a combination. $B_4C$ may also be present in the ceramic product, but was not identified. X-Ray diffraction (X-RD) analysis confirmed the presence of SiC. Elemental analysis of the ceramic product from the pyrolysis of Polymer III showed a trace amount of carbon is present as free carbon.

While a few embodiments of the present invention have been shown and described herein, it will be apparent to those skilled in the art that various modifications and changes can be made in the polyorganoborosilanes, the methods of preparation thereof, and the ceramic materials obtained on pyrolysis of the polyorganoborosilanes without departing from the scope and spirit of the present invention. All such modifications and changes coming within the scope of the appended claims are intended to be covered thereby.

We claim:

1. A process for the preparation of a ceramic material, which process comprises:

pyrolyzing at a temperature above 600° C. in an inert atmosphere a polyorganoborosilane ceramic precusor polymer comprising a plurality of repeating units of the formula:

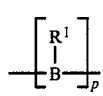

[A]

the polymer unit being linked together by second units of the formula:

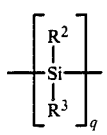

(D)

wherein $R^1$ is selected from lower alkyl, vinyl, cycloalkyl, phenyl, or

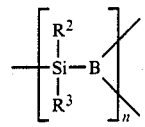

(E)

wherein:
$R^2$ and $R^3$ are each independently selected from halogen, lower alkyl, vinyl, cycloalkyl, or phenyl;
n is an integer between 1 and 100;
p is an integer between 1 and 100; and
q is an integer between 1 and 100.

2. The process of claim 1 wherein $R^1$ is methyl.

3. The process of claim 1 wherein $R^2$ and $R^3$ are each methyl.

4. The process of claim 1 wherein $R^1$ is phenyl and $R^2$ and $R^3$ are each methyl.

5. The process of claim 1 wherein $R^1$ is selected from phenyl or

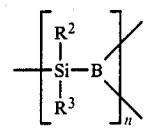

6. A process for the preparation of a ceramic material which process consists essentially of:
(a) pyrolyzing at a temperature above 600° C. in an inert atmosphere a polyorganoborosilane ceramic precusor polymer itself consisting essentially of a plurality of repeating units of the formula:

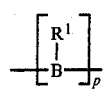

[A]

the polymer unit being linked together by second units of the formula:

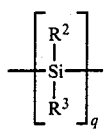

(D)

wherein $R^1$ is lower alkyl, vinyl, cycloalkyl, phenyl, or

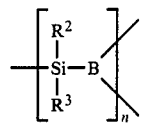

(E)

wherein $R^2$ and $R^3$ are each independently selected from halogen, lower alkyl, vinyl, cycloalkyl, or phenyl; n is an integer between 1 and 100; p is an integer between 1 and 100; and q is an integer between 1 and 100; and (b) recovering the ceramic material obtained thereby.

7. The process of claim 6 wherein $R^1$ is methyl.

8. The process of claim 7 wherein $R^2$ and $R^3$ are each methyl.

9. The process of claim 6 wherein $R^1$ is phenyl and $R^2$ and $R^3$ are each methyl.

10. The process of claim 6 wherein $R^1$ is

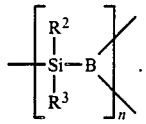

11. A process for the preparation of a ceramic material, which process consists essentially of:

(a) combining an organoborohalide of the formula $R^4$-$B$-$(X^1)_2$ and an organohalosilane of the formula $R^2R^3Si(X^2)_2$ wherein $R^4$ is selected from halogen, lower alkyl, vinyl, cycloalkyl, or phenyl;

$R^2$ and $R^3$ are each independently selected from lower alkyl, vinyl, cycloalkyl, aryl, or substituted aryl; and $X^1$ and $X^2$ are each independently selected from chloro or bromo, in an aprotic solvent having a boiling point at ambient pressure of not greater than 160° C., with at least four equivalents of an alkali metal;

(b) heating the reaction mixture for a time and at a temperature up to 160° C. effective to produce a polyorganoborosilane;

(c) pyrolyzing at a temperature above 600° C. in an inert atmosphere the polyorganoborosilane polymer of step (b) which consists essentially of a plurality of repeating units of the formula:

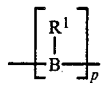  [A]

the polymer unit being linked together by second units of the formula:

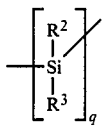  (D)

wherein $R^1$ is lower alkyl, vinyl, cycloalkyl, phenyl, or

  (E)

wherein $R^2$ and $R^3$ are each independently defined hereinabove, n is an integer between 1 and 100; p is an integer between 1 and 100; and q is an integer between 1 and 100; and (d) recovering the ceramic material obtained thereby.

12. The process of claim 11 wherein $R^1$ is methyl.

13. The process of claim 12 wherein $R^2$ and $R^3$ are each methyl.

14. The process of claim 13 wherein $R^1$ is phenyl and $R^2$ and $R^3$ are each methyl.

15. The process of claim 11 wherein $R^1$ is

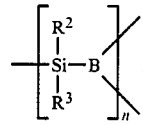

16. The ceramic product of the process of claim 1, wherein the product comprises SiC, $SiB_4$, $SiB_6$, and $B_4C$, and the sum of the $SiB_4$ and $SiB_6$ present is about 17% or greater.

17. The ceramic product of the process of claim 2, wherein the product comprises SiC, $SiB_4$, $SiB_6$ and $B_4C$, and the sum of the $SiB_4$ and $SiB_6$ present is about 17% or greater.

18. The ceramic product of the process of claim 3, wherein the product comprises SiC, $SiB_4$, $SiB_6$ and $B_4C$, and the sum of the $SiB_4$ and $SiB_6$ present is about 17% or greater.

19. The ceramic product of the process of claim 4, wherein the product comprises SiC, $SiB_4$, $SiB_6$ and $B_4C$, and the sum of the $SiB_4$ and $SiB_6$ present is about 17% or greater.

20. The ceramic product of the process of claim 5, wherein the product comprises SiC, $SiB_4$, $SiB_6$ and $B_4C$, and the sum of the $SiB_4$ and $SiB_6$ present is about 17% or greater.

21. The ceramic material of claim 1, which consists essentially of SiC, $SiB_4$, $SiB_6$ and $B_4C$, wherein the sum of the $SiB_4$ and $SiB_6$ present is about 17% or greater.

* * * * *